US012604323B2

(12) United States Patent (10) Patent No.: US 12,604,323 B2
Tsai (45) Date of Patent: Apr. 14, 2026

(54) DECODING AND FORWARDING REPEATER

(71) Applicant: MEDIATEK INC., Hsinchu (TW)

(72) Inventor: Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 389 days.

(21) Appl. No.: 18/368,636

(22) Filed: Sep. 15, 2023

(65) Prior Publication Data

US 2024/0107546 A1 Mar. 28, 2024

Related U.S. Application Data

(60) Provisional application No. 63/384,957, filed on Nov. 24, 2022, provisional application No. 63/377,206, filed on Sep. 27, 2022.

(51) Int. Cl.
*H04W 72/23* (2023.01)
*H04W 72/044* (2023.01)

(52) U.S. Cl.
CPC ......... *H04W 72/23* (2023.01); *H04W 72/044* (2013.01)

(58) Field of Classification Search
CPC ... H04L 5/0007; H04L 5/0023; H04L 5/0044; H04L 5/0048; H04L 5/0053; H04W 72/044; H04W 72/23
See application file for complete search history.

(56) References Cited

U.S. PATENT DOCUMENTS

| | | | | |
|---|---|---|---|---|
| 8,548,514 B2 * | 10/2013 | Kim | ...................... | H04L 5/0064 |
| | | | | 455/515 |
| 8,824,356 B2 * | 9/2014 | Park | ...................... | H04L 5/0053 |
| | | | | 370/315 |
| 8,995,331 B2 * | 3/2015 | Kazmi | .................. | H04W 88/04 |
| | | | | 370/252 |
| 9,065,527 B2 * | 6/2015 | Hoshino | .............. | H04W 88/04 |
| 9,077,495 B2 * | 7/2015 | Wang | ................ | H04W 72/0453 |
| 9,237,583 B2 * | 1/2016 | Chen | ...................... | H04L 5/003 |
| 9,350,522 B2 * | 5/2016 | Feng | ...................... | H04L 5/0053 |
| 9,553,655 B2 * | 1/2017 | Park | .................... | H04L 27/2602 |

(Continued)

FOREIGN PATENT DOCUMENTS

| | | | | | |
|---|---|---|---|---|---|
| CN | 102474378 A | * | 5/2012 | ............ | H04W 72/23 |
| CN | 104041174 A | * | 9/2014 | .......... | H04W 56/001 |

(Continued)

*Primary Examiner* — Eric Nowlin
(74) *Attorney, Agent, or Firm* — Troutman Pepper Locke LLP; Tim Tingkang Xia, Esq.

(57) ABSTRACT
A wireless device receives a first PDCCH from a base station. The first PDCCH indicates a resource allocation of a first PDSCH transmitted on a first time-frequency resource. The wireless device decodes data carried in the first PDSCH according to the first PDCCH. The wireless device obtains a resource allocation of a second PDSCH based on a mapping rule. The mapping rule maps resources of the first PDSCH to resources of the second PDSCH. The wireless device generates encoded bits for the second PDSCH. The encoded bits are based on the decoded data carried in the first PDSCH and the resource allocation of the second PDSCH. The wireless device generates reference signals associated with the second PDSCH. The wireless device transmits the encoded bits to a user equipment (UE). The encoded bits are transmitted on the resources of the second PDSCH on the second time-frequency resource.

20 Claims, 13 Drawing Sheets

(56) References Cited

U.S. PATENT DOCUMENTS

| | | | | |
|---|---|---|---|---|
| 9,912,398 | B2 * | 3/2018 | Shen | H04B 7/155 |
| 9,924,509 | B2 * | 3/2018 | Xu | H04W 28/18 |
| 10,004,063 | B2 * | 6/2018 | Cheng | H04L 5/0044 |
| 10,044,430 | B2 * | 8/2018 | Park | H04L 27/26 |
| 10,193,614 | B2 * | 1/2019 | Park | H04L 5/0094 |
| 10,588,101 | B2 * | 3/2020 | Malladi | H04W 16/26 |
| 10,721,673 | B2 * | 7/2020 | Awad | H04L 5/0092 |
| 10,750,428 | B2 * | 8/2020 | Awad | H04L 5/0092 |
| 11,006,345 | B2 * | 5/2021 | Awad | H04L 5/0007 |
| 11,153,869 | B2 * | 10/2021 | Xu | H04W 72/23 |
| 11,218,967 | B2 * | 1/2022 | Sun | H04W 68/00 |
| 11,350,364 | B2 * | 5/2022 | Sun | H04L 12/2803 |
| 11,463,949 | B2 * | 10/2022 | Akkarakaran | H04W 72/044 |
| 11,737,024 | B2 * | 8/2023 | Sun | H04W 68/02 370/311 |
| 12,047,962 | B2 * | 7/2024 | Abedini | H04W 72/23 |
| 12,382,549 | B2 * | 8/2025 | Schober | H04B 7/15542 |
| 2011/0268064 | A1 * | 11/2011 | Chen | H04L 5/003 370/329 |
| 2011/0317610 | A1 * | 12/2011 | Park | H04L 27/26 370/312 |
| 2012/0040704 | A1 * | 2/2012 | Kim | H04L 5/0064 455/509 |
| 2012/0120868 | A1 * | 5/2012 | Park | H04B 7/2606 370/315 |
| 2012/0182931 | A1 * | 7/2012 | Shen | H04B 7/155 370/315 |
| 2012/0188937 | A1 * | 7/2012 | Wang | H04W 72/0453 370/335 |
| 2012/0263097 | A1 * | 10/2012 | Bi | H04W 72/04 370/315 |
| 2013/0163507 | A1 * | 6/2013 | Hoshino | H04W 88/04 370/315 |
| 2013/0176934 | A1 * | 7/2013 | Malladi | H04W 56/001 370/315 |
| 2013/0188552 | A1 * | 7/2013 | Kazmi | H04L 5/001 370/315 |
| 2014/0064205 | A1 * | 3/2014 | Feng | H04L 5/0092 370/329 |
| 2014/0334376 | A1 * | 11/2014 | Park | H04W 72/23 370/315 |
| 2015/0092703 | A1 * | 4/2015 | Xu | H04W 28/18 370/329 |
| 2015/0163722 | A1 * | 6/2015 | Pasad | H04L 5/0053 370/315 |
| 2015/0327226 | A1 * | 11/2015 | Cheng | H04L 5/0044 370/329 |
| 2016/0380735 | A1 * | 12/2016 | Chung | H04L 5/0048 370/329 |
| 2017/0034764 | A1 * | 2/2017 | Awad | H04B 7/15542 |
| 2017/0104519 | A1 * | 4/2017 | Park | H04L 27/2602 |
| 2018/0167942 | A1 * | 6/2018 | Xu | H04W 72/1268 |
| 2018/0302146 | A1 * | 10/2018 | Park | H04B 7/2606 |
| 2018/0324669 | A1 * | 11/2018 | Awad | H04L 5/0039 |
| 2020/0169956 | A1 * | 5/2020 | Sun | H04W 72/04 |
| 2020/0336966 | A1 * | 10/2020 | Awad | H04L 5/0092 |
| 2021/0144641 | A1 * | 5/2021 | Sun | H04W 68/00 |
| 2021/0212165 | A1 * | 7/2021 | Schober | H04B 7/15542 |
| 2022/0078838 | A1 * | 3/2022 | Abedini | H04W 72/0446 |
| 2022/0124619 | A1 * | 4/2022 | Sun | H04W 72/04 |
| 2023/0171036 | A1 * | 6/2023 | Selvanesan | H04L 1/1671 370/315 |
| 2023/0171826 | A1 * | 6/2023 | Selvanesan | H04W 76/14 370/310 |
| 2024/0188121 | A1 * | 6/2024 | Yang | H04W 72/23 |
| 2024/0305358 | A1 * | 9/2024 | Yang | H04B 7/15542 |
| 2024/0305997 | A1 * | 9/2024 | Lee | H04W 74/0808 |
| 2024/0306216 | A1 * | 9/2024 | Jiang | H04W 74/0833 |
| 2024/0322990 | A1 * | 9/2024 | Zhang | H04L 5/0053 |
| 2025/0039927 | A1 * | 1/2025 | Fang | H04W 16/14 |

FOREIGN PATENT DOCUMENTS

| | | | | | |
|---|---|---|---|---|---|
| CN | 104186017 | A | * | 12/2014 | H04L 5/0094 |
| CN | 102907159 | B | * | 3/2016 | H04W 72/23 |
| EP | 2461503 | A2 | * | 6/2012 | H04W 72/23 |
| EP | 2485560 | A1 | * | 8/2012 | H04W 72/0453 |
| EP | 2461503 | A4 | * | 11/2015 | |
| EP | 2941077 | A1 | * | 11/2015 | H04W 72/23 |
| EP | 2461503 | B1 | * | 3/2019 | H04W 72/23 |
| EP | 2801237 | B1 | * | 5/2019 | H04W 16/26 |
| EP | 2620026 | B1 | * | 8/2020 | H04W 76/15 |
| JP | 2015508605 | A | * | 3/2015 | H04W 16/26 |
| JP | 5714698 | B2 | * | 5/2015 | H04W 72/23 |
| JP | 2023538797 | A | * | 9/2023 | H04L 1/1854 |
| JP | 7601121 | B2 | * | 12/2024 | H04L 1/1854 |
| JP | 2025027052 | A | * | 2/2025 | H04L 1/1854 |
| KR | 20140113987 | A | * | 9/2014 | H04W 56/001 |
| KR | 20230031289 | A | * | 3/2023 | H04L 1/1854 |
| WO | WO-2011013962 | A3 | * | 4/2011 | |
| WO | WO-2011038670 | A1 | * | 4/2011 | H04W 72/0453 |
| WO | WO-2012039656 | A1 | * | 3/2012 | H04W 76/15 |
| WO | WO-2013103754 | A1 | * | 7/2013 | H04W 56/002 |
| WO | WO-2015048216 | A1 | * | 4/2015 | H04W 72/23 |
| WO | WO-2020064078 | A1 | * | 4/2020 | H04W 76/14 |
| WO | WO-2021255256 | A1 | * | 12/2021 | H04L 1/1854 |
| WO | WO-2022246730 | A1 | * | 12/2022 | H04W 72/569 |

* cited by examiner

300

304

NG-CN

5G C-plane

5G-GW

306

5G AN

310

NG-AN

302

ANC

F1-C    F1-U    F1-C    F1-U    F1-C    F1-U

308

TRP    TRP    TRP

400

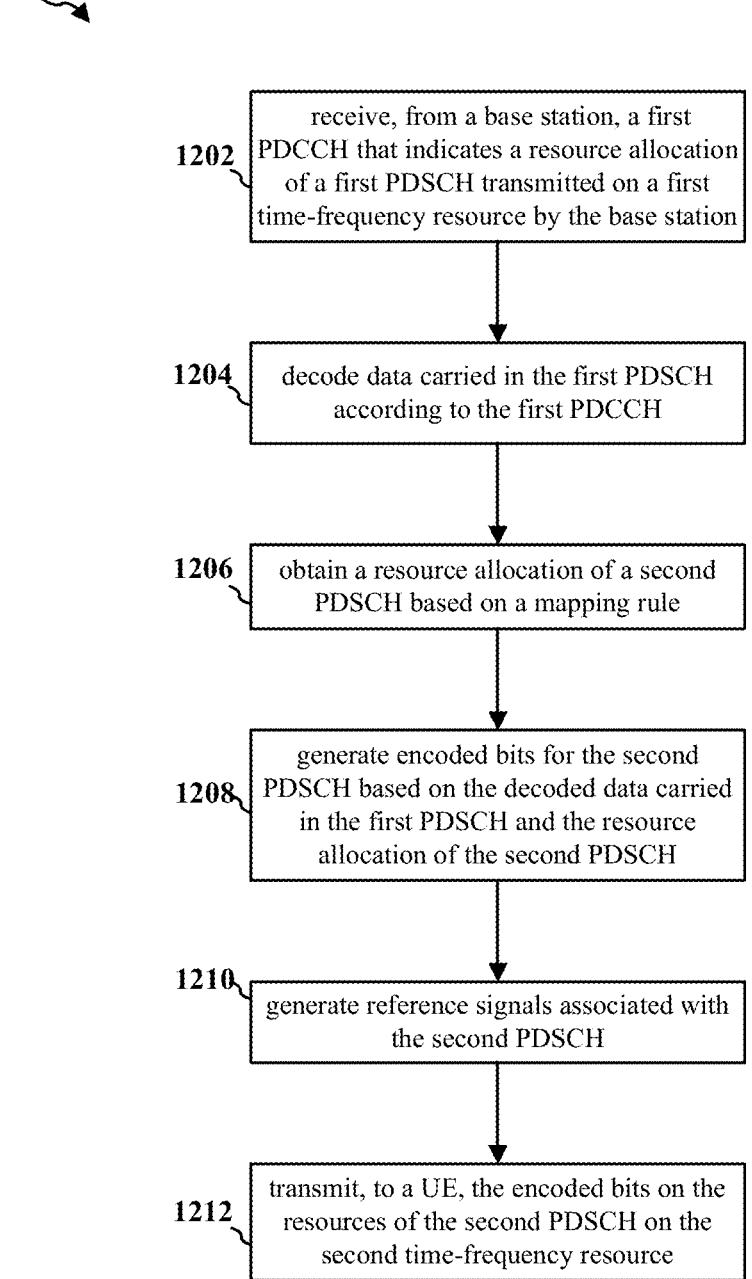

1200

1202   receive, from a base station, a first PDCCH that indicates a resource allocation of a first PDSCH transmitted on a first time-frequency resource by the base station 1204   decode data carried in the first PDSCH according to the first PDCCH 1206   obtain a resource allocation of a second PDSCH based on a mapping rule 1208   generate encoded bits for the second PDSCH based on the decoded data carried in the first PDSCH and the resource allocation of the second PDSCH 1210   generate reference signals associated with the second PDSCH 1212   transmit, to a UE, the encoded bits on the resources of the second PDSCH on the second time-frequency resource

FIG. 12

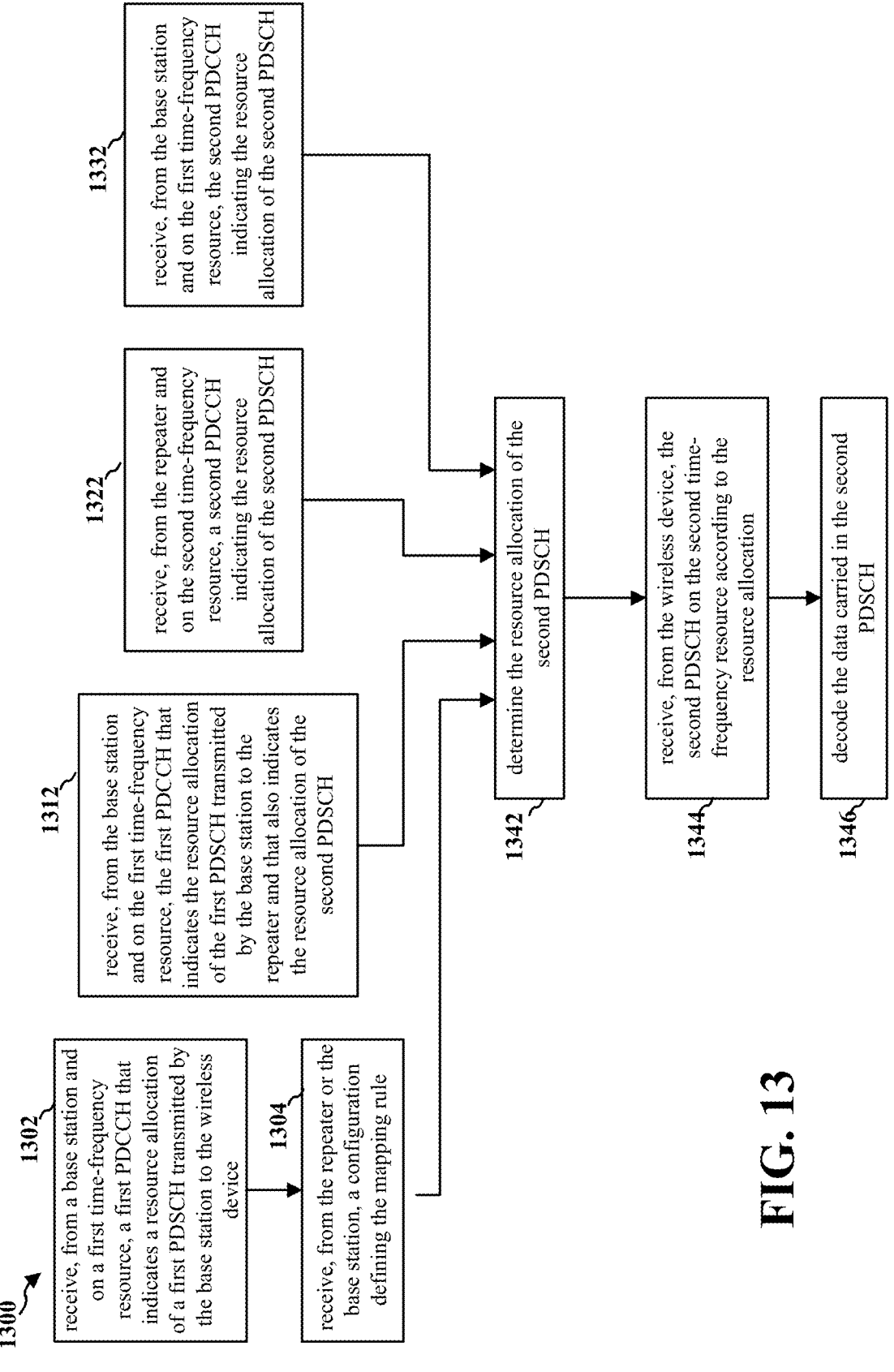

1300

1302
receive, from a base station and on a first time-frequency resource, a first PDCCH that indicates a resource allocation of a first PDSCH transmitted by the base station to the wireless device 1304
receive, from the repeater or the base station, a configuration defining the mapping rule 1312
receive, from the base station and on the first time-frequency resource, the first PDCCH that indicates the resource allocation of the first PDSCH transmitted by the base station to the repeater and that also indicates the resource allocation of the second PDSCH 1322
receive, from the repeater and on the second time-frequency resource, a second PDCCH indicating the resource allocation of the second PDSCH 1332
receive, from the base station and on the first time-frequency resource, the second PDCCH indicating the resource allocation of the second PDSCH 1342
determine the resource allocation of the second PDSCH 1344
receive, from the wireless device, the second PDSCH on the second time-frequency resource according to the resource allocation 1346
decode the data carried in the second PDSCH

FIG. 13

DECODING AND FORWARDING REPEATER

CROSS-REFERENCE TO RELATED APPLICATION(S)

This application claims the benefits of U.S. Provisional Application Ser. No. 63/377,206, entitled "DECODE-AND-FORWARD L1 REPEATERS" and filed on Sep. 27, 2022, and U.S. Provisional Application Ser. No. 63/384,957, entitled "DECODE-AND-FORWARD L1 REPEATERS" and filed on Nov. 24, 2022, both of which are expressly incorporated by reference herein in their entirety.

BACKGROUND

Field

The present disclosure relates generally to communication systems, and more particularly, to techniques of decoding & forwarding data at a repeater.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device. The wireless device receives a first physical downlink control channel (PDCCH) from a base station. The first PDCCH indicates a resource allocation of a first physical downlink shared channel (PDSCH) transmitted on a first time-frequency resource. The wireless device decodes data carried in the first PDSCH according to the first PDCCH. The wireless device obtains a resource allocation of a second PDSCH based on a mapping rule. The mapping rule maps resources of the first PDSCH to resources of the second PDSCH. The wireless device generates encoded bits for the second PDSCH. The encoded bits are based on the decoded data carried in the first PDSCH and the resource allocation of the second PDSCH. The wireless device generates reference signals associated with the second PDSCH. The wireless device transmits the encoded bits to a user equipment (UE). The encoded bits are transmitted on the resources of the second PDSCH on the second time-frequency resource.

In another aspect of the disclosure, a method, a computer-readable medium, and an apparatus are provided. The apparatus may be a UE. The UE determines a resource allocation of a second physical downlink shared channel (PDSCH). The second PDSCH is on a second time-frequency resource transmitted from a wireless device. The second PDSCH carries data transmitted from a base station. The UE receives the second PDSCH from the wireless device. The second PDSCH is received on the second time-frequency resource according to the resource allocation. The UE decodes the data carried in the second PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a flow chart of a method (process) for decoding and forwarding data transmitted from a base station to a UE.

FIG. 13 is a flow chart of a method (process) for receiving data transmitted from a base station via a repeater.

DETAILED DESCRIPTION

Figure 1:
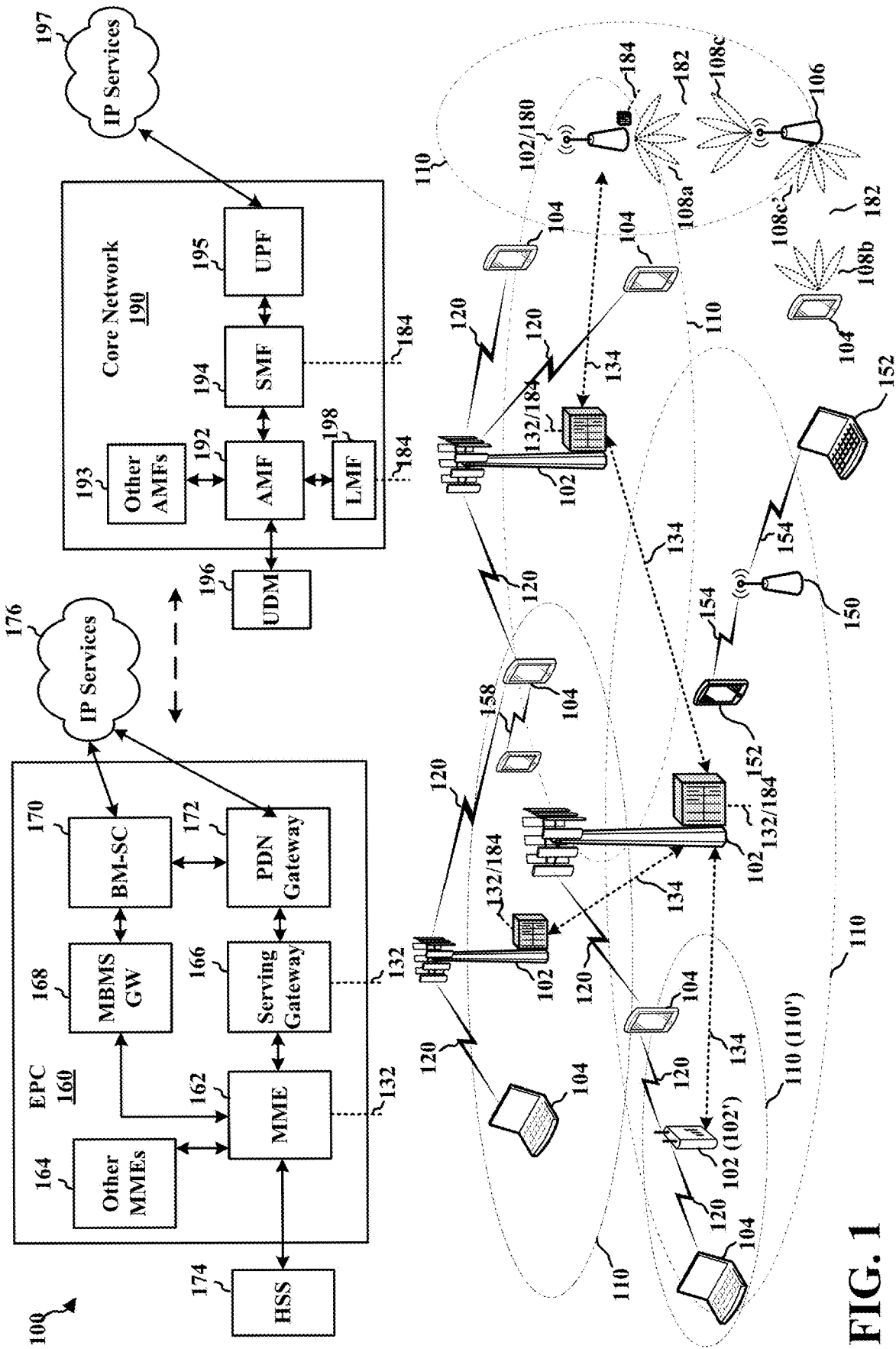
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
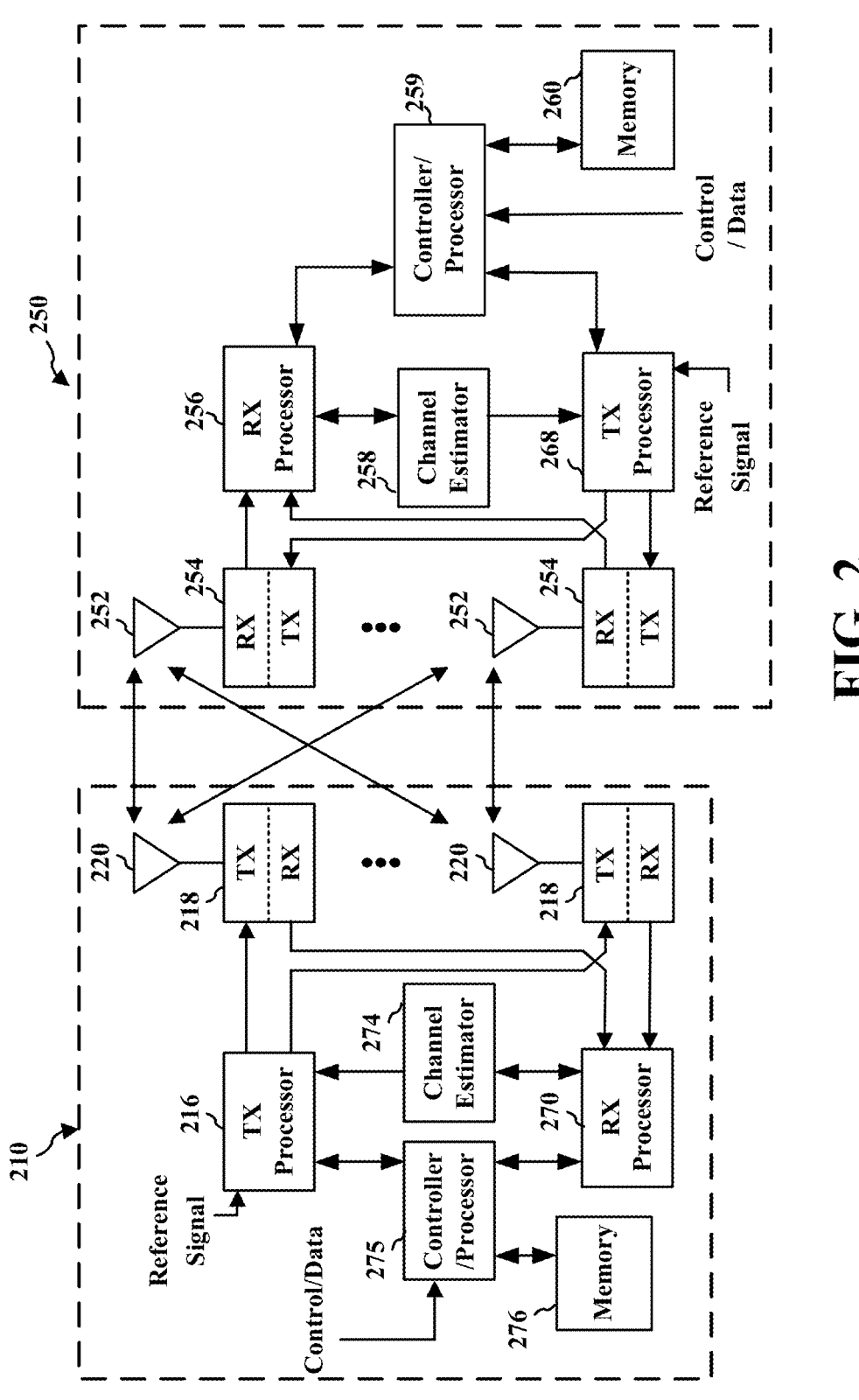
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers for each RB with a sub-carrier spacing (SCS) of 60 kHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
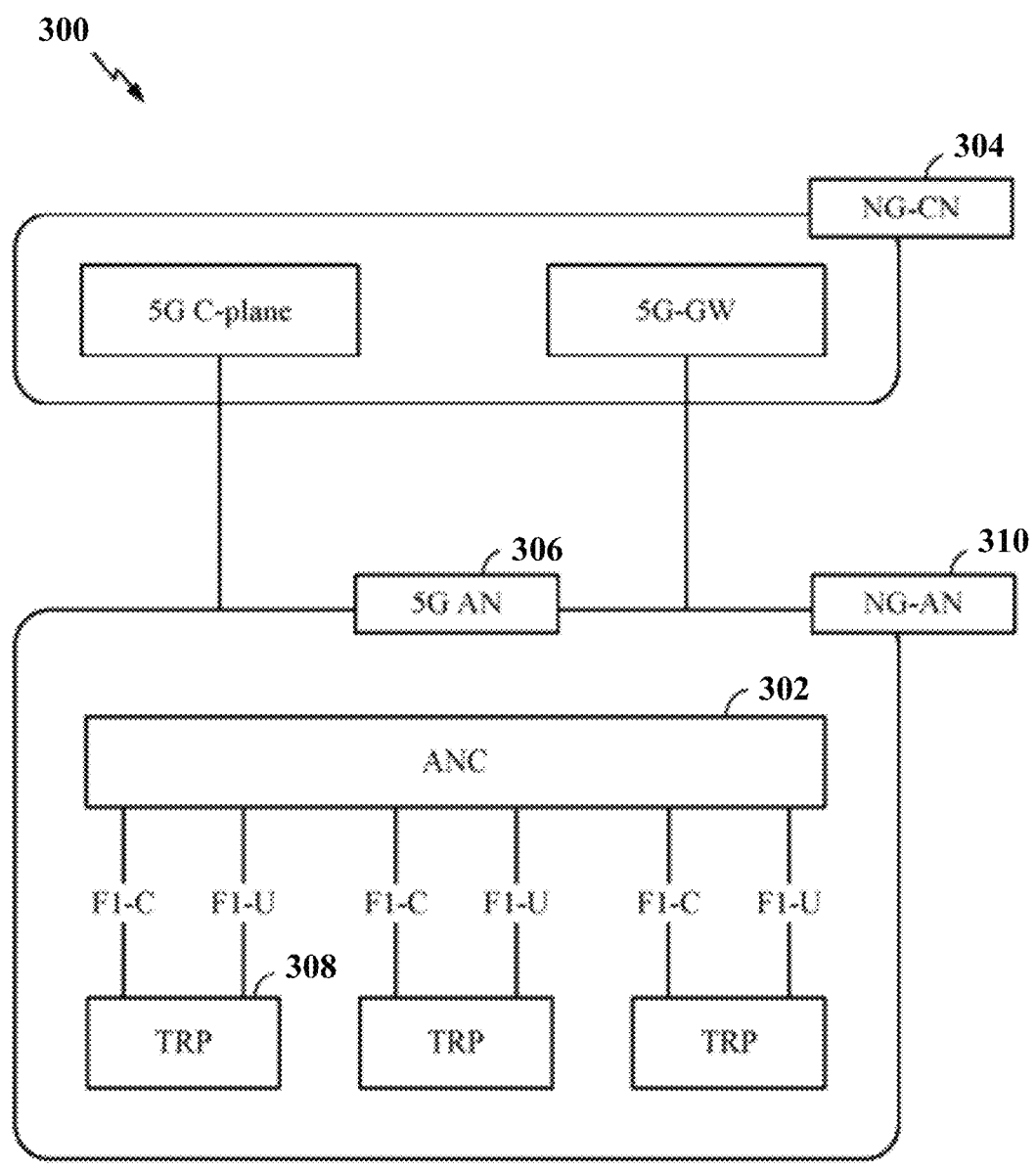
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
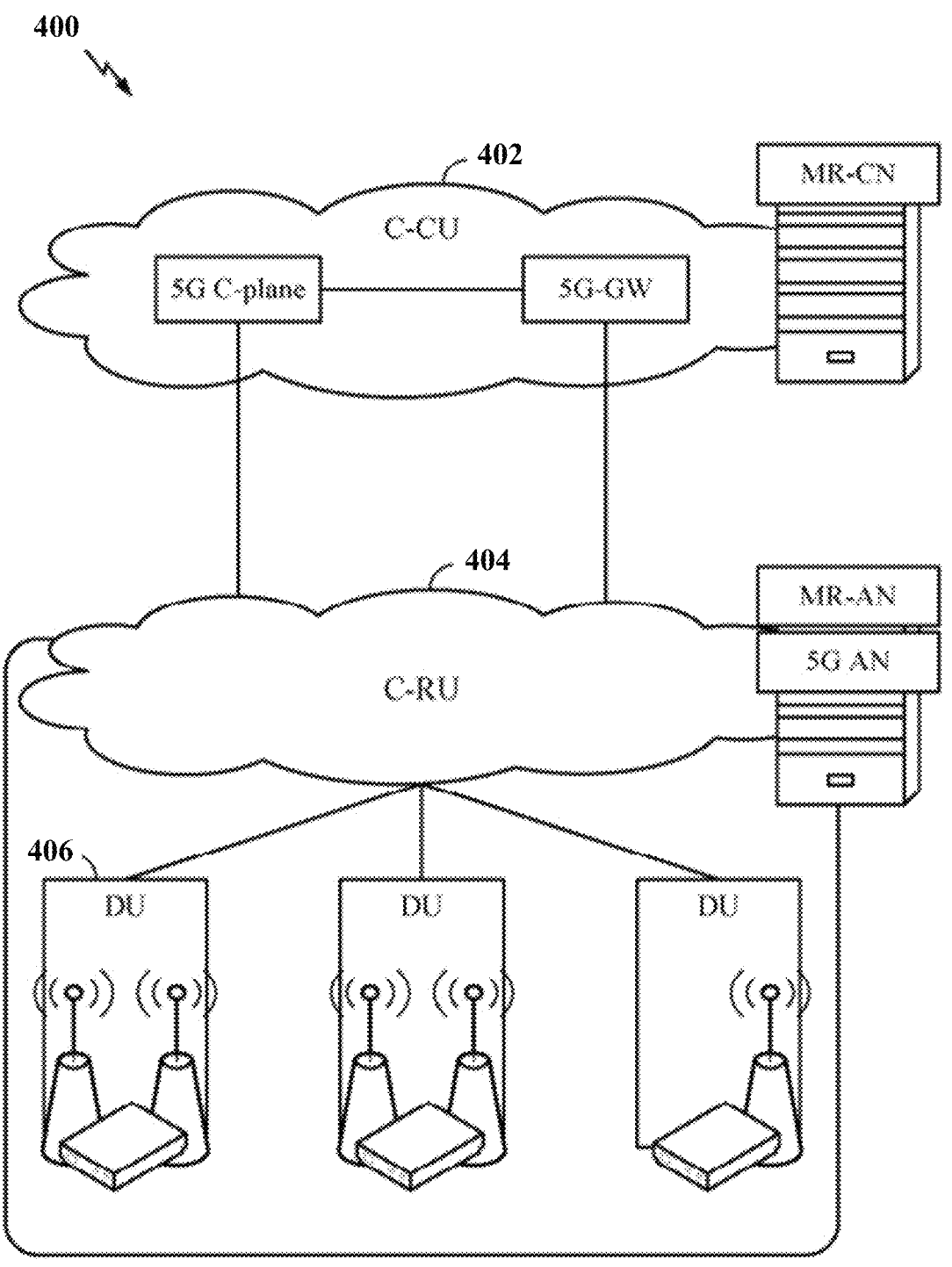
FIG. 4 illustrates an example physical architecture of a distributed access network.

FIG. 4 illustrates an example physical architecture of a distributed RAN 400, according to aspects of the present disclosure. A centralized core network unit (C CU) 402 may host core network functions. The C-CU may be centrally deployed. C CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
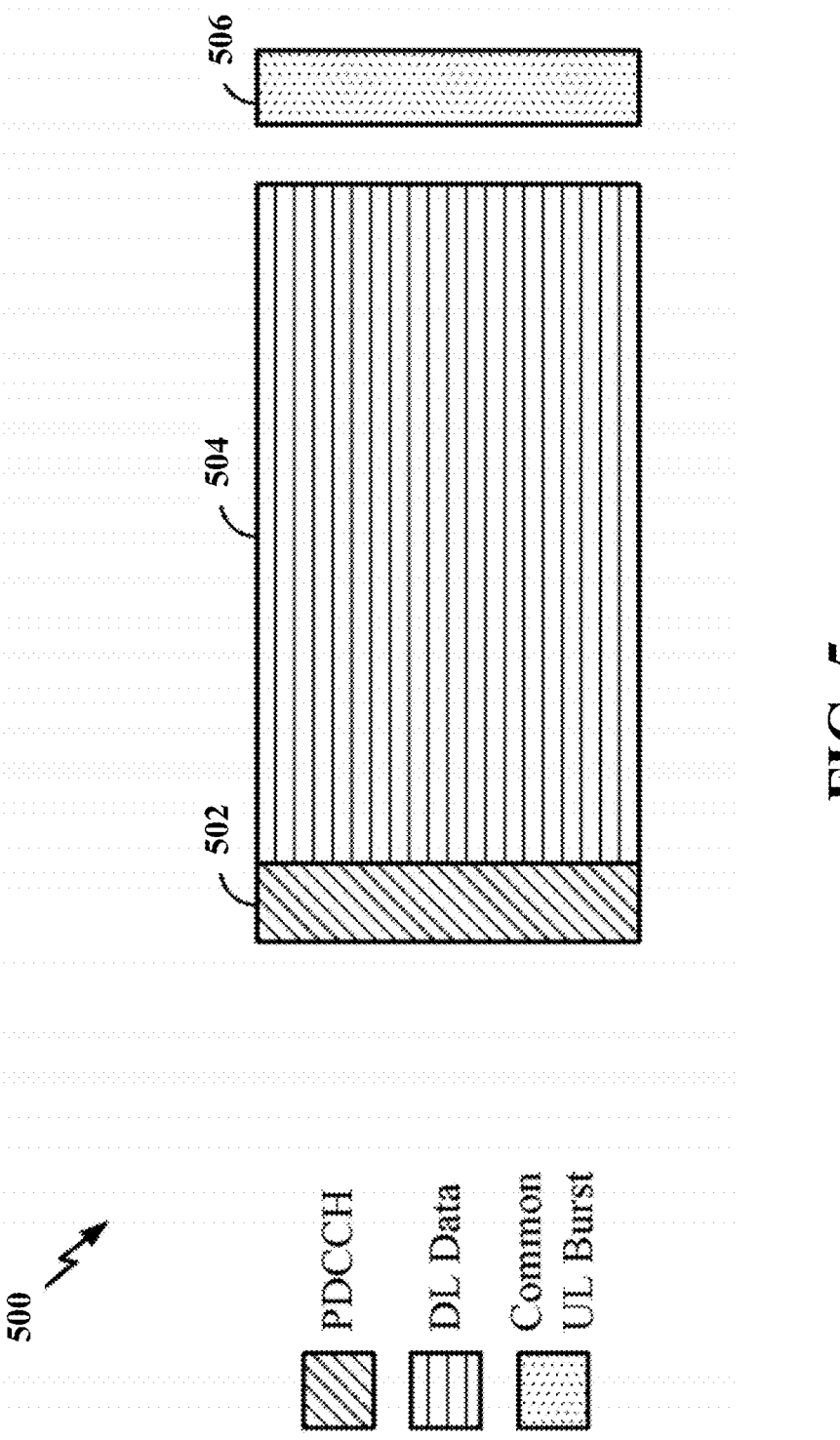
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
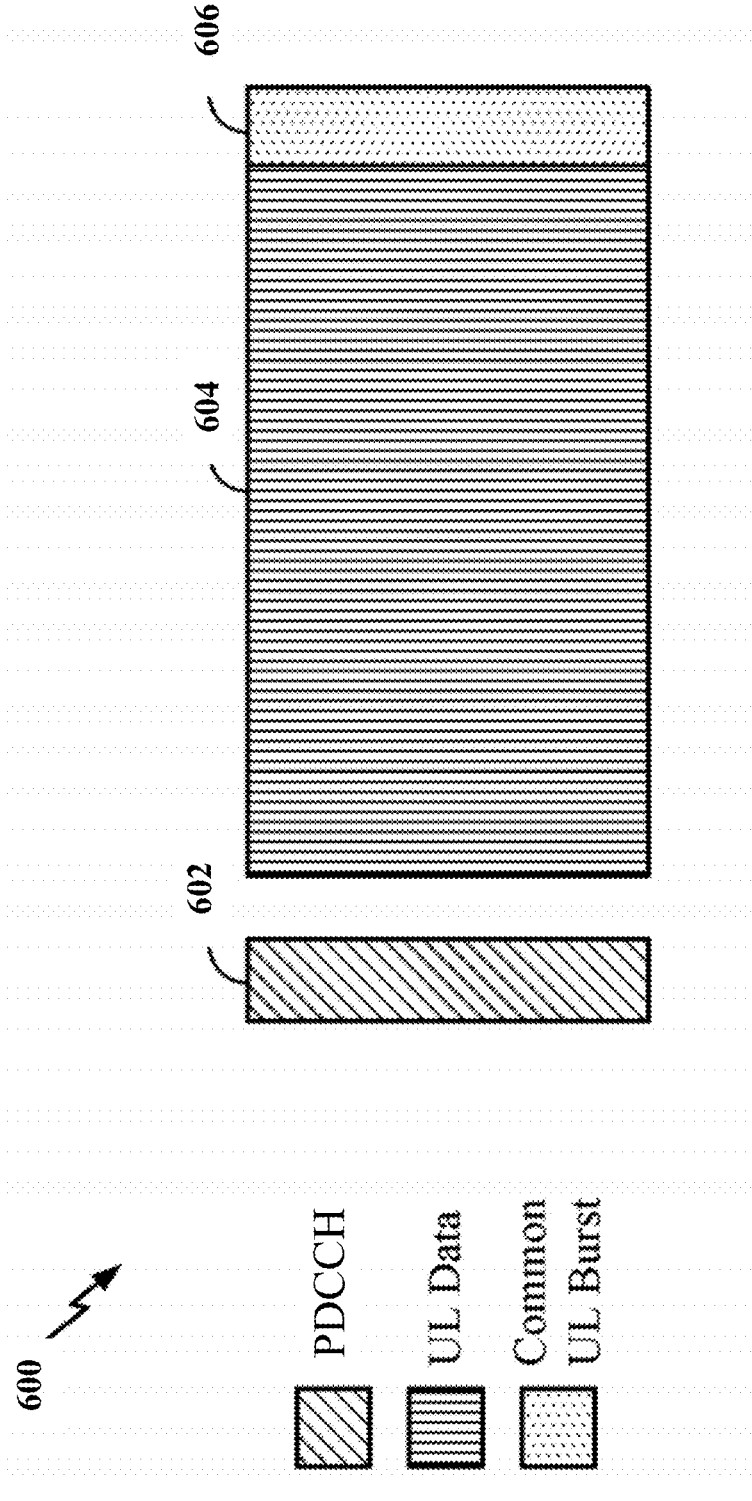
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
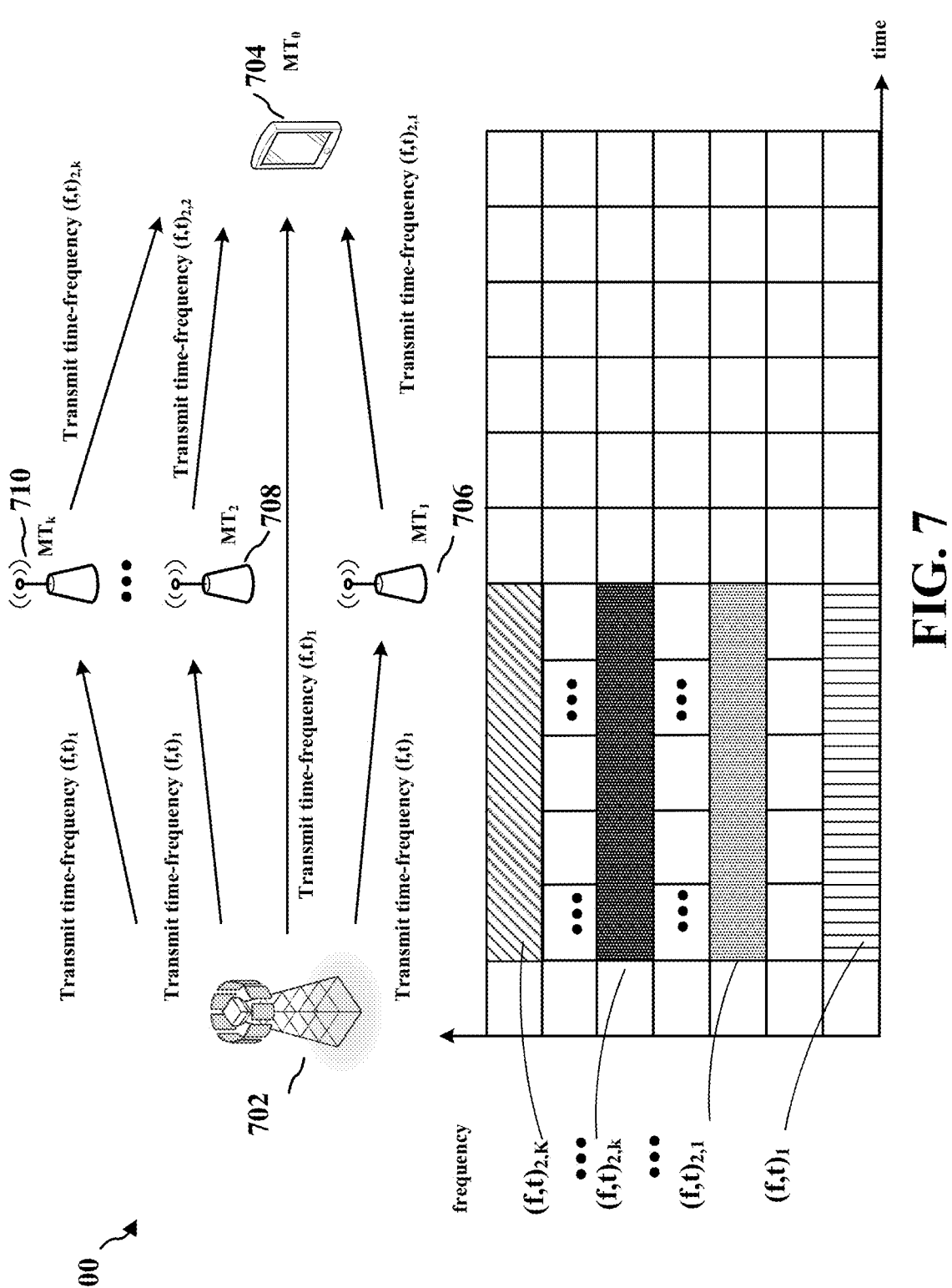
FIG. 7 is a diagram illustrating a distributed downlink MIMO transmission.

FIG. 7 is a diagram 700 illustrating a distributed downlink MIMO transmission. A base station 702 and a UE 704 communicate with each other via one or more repeaters 706, 708 . . . 710. The repeaters may be wireless devices such as mobile phones, fixed CPEs, and wireless routers. In this example, there are K repeaters (K is an integer and K≥1). The UE 704 and the K repeaters 706, 708, . . . 710 are connected together to form a high-rank MIMO transmitter/receiver network to expand the channel rank.

As described infra, a repeater receives RF signals on a first frequency band $f_1$ through a first PDSCH, decodes modulated symbols of the first PCSCH to obtain information bits carried by the first PDSCH, re-encodes the information bits and shifts the RF carrier of the RF signals to a second frequency band $f_2$, and then transmits the shifted RF signals on the second frequency band $f_2$ through a second PDSCH. Each frequency band is an interval in frequency domain. In particular, the repeater may be a frequency translating repeater. The repeater may also be a time delaying repeater, which receive RF signals and then re-transmit the received RF signals after some time delay. Further, the repeater may receive RF signals in a first time-frequency resource, translate the received RF signals to a second time-frequency resource, and then transmit the translated RF signals. In particular, the first time-frequency resource may be orthogonal with the second time-frequency resource.

Using (f, t) to denote the time-frequency resources: $(f, t)_1$ denotes the time-frequency resource used by the base station for transmitting and receiving RF signals. $(f, t)_{2,k}$ denotes the resources used by a particular repeater $MT_k$ (k is an integer and 1≤k≤K) to transmit RF signals to the UE. As such, $(f, t)_{2,1}$ indicates the resources used by the UE 704 to receive RF signals from the repeater 706 (i.e., $MT_1$); $(f, t)_{2,2}$ indicates the resources used by the UE 704 to receive RF signals from the repeater 708 (i.e., $MT_2$), and so on. In certain configurations, $(f, t)_1$, $(f, t)_{2,1}$, $(f, t)_{2,2}$, . . . and $(f, t)_{2,K}$ are orthogonal. In particular, they do not overlap in frequency domain. In certain configurations, $(f, t)_1$ may be the same as one $(f, t)_{2,k}$ (k∈1, . . . K), while the rest are orthogonal to each other. Further, $(f, t)_1$ and $(f, t)_{2,k}$ (1≤k≤K) can be non-overlapped component carriers, non-overlapped bandwidth parts (BWPs), non-overlapped frequency bands, or non-overlapped collections within the same component carrier. To provide sufficient time for decoding the first PDSCH at the repeaters, $(f, t)_{2,k}$ is typically after $(f, t)_1$.

Figure 8:
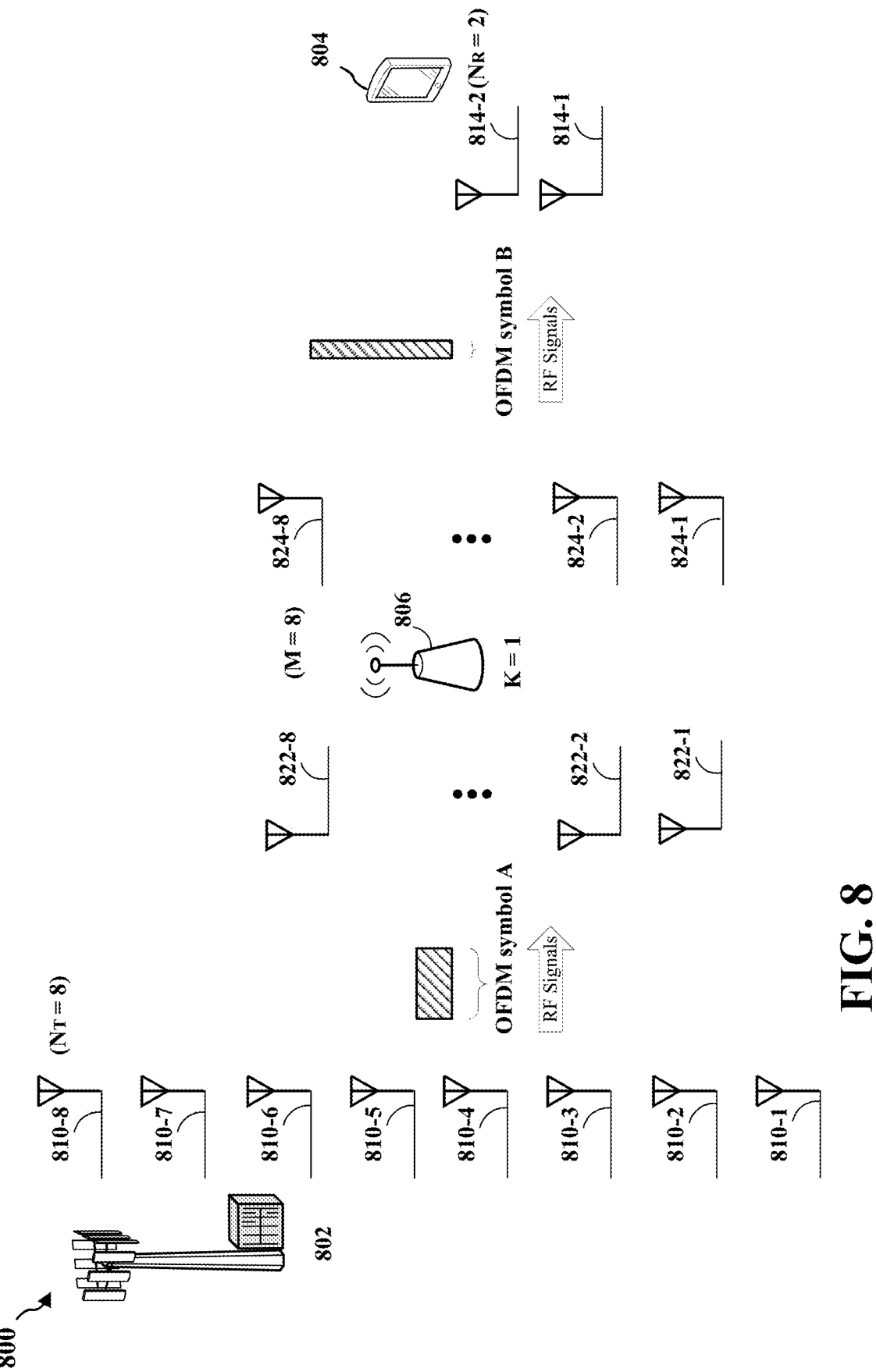
FIG. 8 is a diagram illustrating downlink MIMO transmission from a base station to a UE via a repeater.

FIG. 8 is a diagram 800 illustrating downlink MIMO transmission from a base station to a UE via one repeater. In this example, a base station 802 has 8 antennas 810-1, 810-2, . . . 810-8, and a UE 804 has 2 reception antennas 814-1, 814-2. Further, a repeater 806 is placed between the base station 802 and the UE 804. The repeaters 806 has 8 reception antennas 822-1, 822-2, . . . , 822-8 and 8 transmission antennas 824-1, 824-2, . . . , 824-8. In certain configurations, the same antenna may function as a reception antenna and a transmission antenna. The base station 802 can simultaneously transmit signals to the repeater 806 at the time-frequency resource $(f, t)_1$. The repeater 806 can simultaneously transmit signals to the UE 804 at the time-frequency resource $(f, t)_2$. The time-frequency resource $(f, t)_1$ and $(f, t)_2$ can be in the same component carrier (CC), bandwidth parts (BWP) or frequency band. The time-frequency resource $(f, t)_1$ and $(f, t)_2$ can be in two non-overlapped CCs, two non-overlapped BWPs or two non-overlapped frequency bands. Subcarrier spacing (SCS) used in the first time-frequency resource $(f, t)_1$ could be different from that in second time-frequency resource $(f, t)_2$. In this example, the first time-frequency resource $(f, t)_1$ is within a band in FR1 and is associated with $SCS_1=30$ kHz, the second time-frequency resource $(f, t)_2$ is within a band in FR2 and is associated with $SCS_2=120$ kHz. In this example, TTI length with SCSl is four times TTI length with $SCS_2$.

Figure 9:
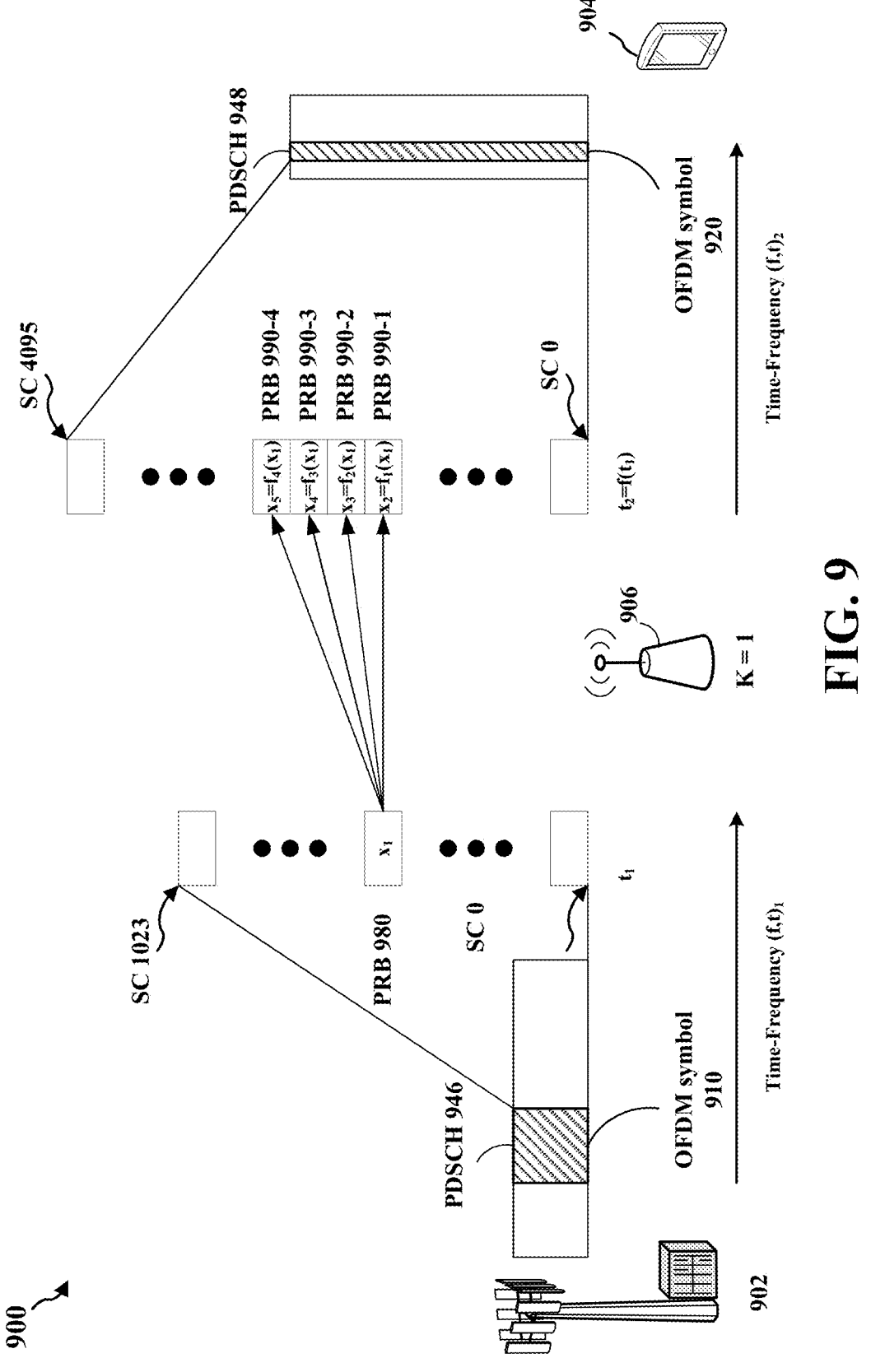
FIG. 9 is a diagram illustrating a mapping rule that maps a resource allocation (RA) on a first time-frequency resource to RA on a second time-frequency resource.

FIG. 9 is a diagram 900 illustrating a mapping rule that maps resource allocation (RA) on a first time-frequency resource to RA on a second time-frequency resource. More specifically, the mapping maps a first time-frequency resource $(f, t)_1$ to a second time-frequency resource $(f, t)_2$. The mapping can be located in time domain, frequency domain or in time-frequency domain.

In this example, a repeater 906 is placed between a base station 902 and a UE 904. The base station 902 transmits to the repeater 906 a PDSCH 946 carried on the first time-frequency resource $(f, t)_1$. The repeater 906 demodulates and decodes the PDSCH 946 to obtain the original information bits. Further, the repeater 906 re-encodes and modulates the original information bits to obtain modulation symbols to be carried in a PDSCH 948 on the second time-frequency resource $(f, t)_2$ according to the mapping rule. The mapping rule translates the resource allocation of the first time-frequency resource $(f, t)_1$ used by the PDSCH 946 to the resource allocation of the second time-frequency resource $(f, t)_2$ used by the PDSCH 948. For example, suppose a physical resource block (PRB) 980 with index $x_1$ at time $t_1$ is allocated for the PDSCH 946. The mapping rule defines how this PRB 980 is mapped to one or more PRBs for the PDSCH 948.

Three examples of the mapping rule are:
1) Mapping in frequency domain: The index $x_2$ of the mapped PRB 990 in PDSCH 948 is determined as $x_2=g(x_1)$, where $g(x_1)$ is a mapping function from $x_1$ to $x_2$.
2) Mapping in time domain: The time $t_2$ of the mapped PRB 990 in PDSCH 948 is determined as $t_2=g(t_1)$, where $g(t_1)$ is a mapping function from $t_1$ to $t_2$. For example, $g(t_1)$ can be a constant offset, e.g., $g(t_1)=t_1+$ offset.
3) Mapping in time-frequency domain: The index $x_2$ and time $t_2$ of the mapped PRB 990 in PDSCH 948 are determined as $(x_2, t_2)=g(x_1, t_1)$, where $g(x_1, t_1)$ maps $(x_1, t_1)$ to $(x_2, t_2)$.
The mapping can be one-to-one or one-to-multiple. In one example, the base station 902 transmits PDSCH 946 using 1024 subcarriers with subcarrier spacing (SCS) $SCS_1=30$ kHz. The repeater 906 transmits PDSCH 948 using 4096 subcarriers with $SCS_2=120$ kHz. Each PRB in PDSCH 946 maps to 4 PRBs in PDSCH 948. A PRB 980 in PDSCH 946 at $(x_1, t_1)$ may be mapped to PRBs 990-1 at $(x_2, t_2)$ per $g_1$, 990-2 at $(x_3, t_2)$ per $g_2$, 990-3 at $(x_4, t_2)$ per $g_3$, and 990-4 at $(x_5, t_2)$ per $g_4$ in PDSCH 948. In other words, one PRB 980 in PDSCH 946 may be mapped to multiple PRBs 990-1, 990-2, 990-3, 990-4 in PDSCH 948 according to multiple mapping functions $g_1$, $g_2$, $g_3$, $g_4$.

Figure 10:
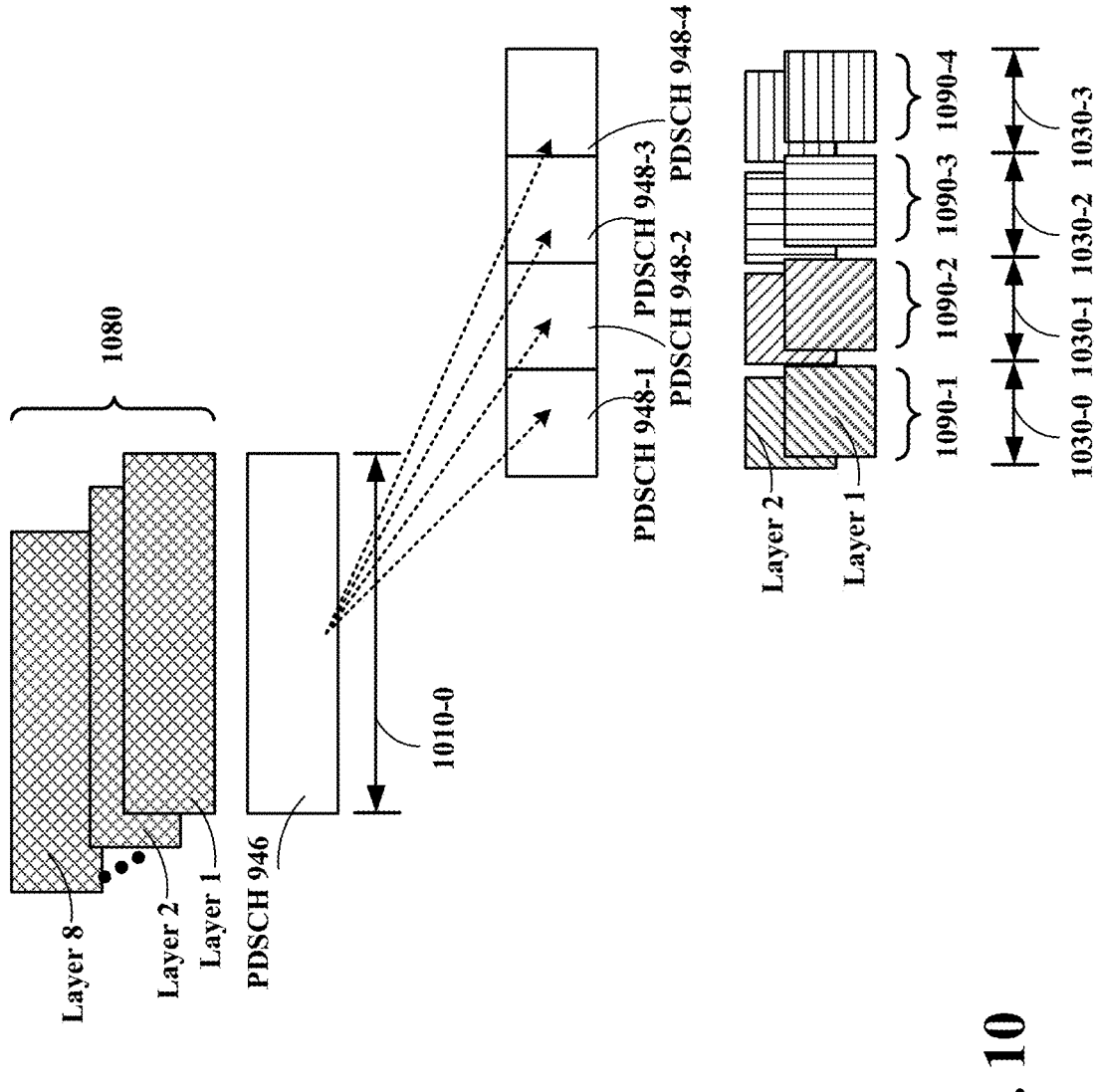
FIG. 10 is a diagram illustrating a mapping rule that maps data transmission in a first PDSCH to data transmission in a second PDSCH.

FIG. 10 is a diagram 1000 illustrating a mapping rule that maps data transmission in a first PDSCH to data transmission in a second PDSCH. In this example, the base station 902 transmits a PDSCH 946 carrying a transport block (TB) 1080 to the repeater 906 in a slot 1010-0 on $f_1$. The PDSCH 946 is transmitted using 8 transmission antennas of the base station 902. The TB 1080 contains data corresponding to 8 spatial layers. The slot 1010-0 has a duration of $TTI_1$ (e.g. 0.5 ms) based on a first subcarrier spacing $SCS_1$ (e.g. 30 kHz).

The repeater 906 receives the PDSCH 946 using 8 reception antennas on $f_1$. The repeater 906 decodes the modulated symbols to obtain the information bits carried in TB 1080. It then re-encodes the information bits to generate 4 TBs 1090-1, 1090-2, 1090-3 and 1090-4, each containing 2 spatial layers of data from the original 8 spatial layers.

The repeater 906 transmits the 4 TBs using 2 transmission antennas in slots 1030-0, 1030-1, 1030-2 and 1030-3 on $f_2$, through PDSCHs 948-1, 948-2, 948-3 and 948-4 respectively. The slots 1030-0 to 1030-3 have a duration of $TTI_2$ (e.g. 0.125 ms) based on a second subcarrier spacing $SCS_2$ (e.g. 120 kHz). In this example, $TTI_1$ is 4 times $TTI_2$, and $SCS_2$ is 4 times $SCS_1$. The repeater may transmit TB 1090-1 (containing first 2 spatial layers of data) in PDSCH 948-1 in slot 1030-0, TB 1090-2 (containing next 2 spatial layers of data) in PDSCH 948-2 in slot 1030-1, and so on until all 8 spatial layers have been transmitted over 4 slots.

The resource allocation (RA) of the PDSCHs 948-1 to 948-4 is determined based on a mapping rule as described in FIG. 9. For example, if a certain PRB is allocated for PDSCH 946, the mapping rule defines how that PRB maps to one or more PRBs for the PDSCHs 948-1 to 948-4.

When transmitting the PDSCHs 948-1 to 948-4, the repeater 906 also needs to generate corresponding reference signals (e.g. DMRS, TRS, PTRS) along with each PDSCH for the UE 904 to estimate channel parameters. Subcarriers occupied by these reference signals are reserved and cannot be used to carry the encoded bits of the PDSCHs. The configurations for generating these reference signals to be transmitted on the second time-frequency resources $(f, t)_2$ should be provided from the network.

The encoded bits of the TBs 1090-1 to 1090-4 are mapped to modulation symbols which are then mapped to the available subcarriers in the PDSCHs 948-1 to 948-4. The modulation symbols may be punctured or rate matched around the reserved subcarriers occupied by reference signals. Puncturing means the repeater 906 maps the encoded bits sequentially to modulation symbols, but skips mapping to subcarriers that are reserved. The encoded bits corresponding to the reserved subcarriers are discarded. Rate matching means the repeater 906 maps the encoded bits sequentially but skips over reserved subcarriers to the next available subcarrier. The encoded bits are not discarded. Thus, only the subcarriers that are not reserved for reference signals can be used to carry the modulation symbols containing encoded bits for the PDSCHs 948-1 to 948-4.

By decoding the PDSCH 946 and re-encoding for transmission, the repeater 906 can remove any interference present in the received signals from the base station 902. The mapping rule allows the repeater 906 to determine the resource allocation for transmitting the PDSCHs 948-1 to 948-4 immediately after decoding the control information, without needing additional scheduling delays.

As described supra, the PDSCH 946-1 and the PDSCHs 948-1, 948-2, 948-3 and 948-4 carry the identical information bits. The encoded bits of the PDSCH 946-1 and the encoded bits of the PDSCHs 948-1, 948-2, 948-3 and 948-4 are both derived from the same set of the information bits.

However, the encoded bits of the PDSCH 946-1 may not be the same as the encoded bits of the PDSCHs 948-1, 948-2, 948-3 or 948-4 because of different code rates or modulation schemes. The repeater 906 may use a different modulation and coding scheme (MCS) to re-encode the information bits for the PDSCHs 948-1, 948-2, 948-3 and 948-4 compared to the MCS used for PDSCH 946-1.

The mapping rule may imply to follow the same modulation order as that of the PDSCH 946-1. Alternatively, the mapping rule may imply adjustments to the channel coding rule, code rate, or modulation order from the PDSCH 946-1 to the PDSCHs 948-1, 948-2, 948-3 and 948-4.

The mapping rule is pre-defined so that the encoding of the second PDSCH can start right after knowing coding and layer-mapping information of the first PDSCH. As described supra, the repeater 906 receives the PDSCH 946 from the base station 902 on the first time-frequency resource $(f, t)_1$. The PDSCH 946 contains a transport block (TB) 1080 spanning 8 spatial layers.

The repeater 906 can decode the PDCCH 942 transmitted prior to the PDSCH 946 to determine the resource allocation for the PDSCH 946, such as which PRBs are occupied by the PDSCH 946. This resource allocation information for the first PDSCH 946 also allows the repeater 906 to determine the resource allocation for the second PDSCHs 948-1 to 948-4 based on the pre-defined mapping rule.

For example, if the mapping rule specifies that PRB #x in the first PDSCH 946 maps to 4 PRBs starting from PRB #x in the second PDSCHs 948, then upon decoding the PDCCH 942, the repeater 906 can immediately determine the corresponding PRBs in the second PDSCHs 948-1 to 948-4.

Right after knowing coding and layer-mapping information of the PDSCH 946-1, the repeater 906 can re-encode the original information bits to generate the TB 1090-1, 1090-2, 1090-3 and 1090-4, which are transmitted through the PDSCHs 948-1, 948-2, 948-3 and 948-4 on the time and frequency resource $(f, t)_2$.

Each TB 1090-1 to 1090-4 contains data for 2 spatial layers from the original 8 spatial layers in TB 1080. By starting the encoding process as soon as the resource allocation is known from the mapping rule, the repeater 906 can reduce processing delays compared to waiting until the entire PDSCH 946-1 is decoded before determining the parameters for PDSCHs 948-1 to 948-4.

As another example, after determining code-rate, modulation order, the number of spatial layers, and the number of TTIs to be used for the second PDSCH, the repeater 906 re-encodes data extracted from the original 8 spatial layers in TB 1080 to form modulated symbols to be carried by the second PDSCH. The repeater then maps the modulated symbols to resource elements (REs) in the second PDSCH in a specific order in time, frequency and spatial domain. For example, assuming that the second PDSCH is to occupy 4 TTIs and in each TTI there are two spatial layers, the repeater 906 can map encoded bits in a "spatial-domain first, time-domain second, and frequency-domain third" order to the REs of the second PDSCH. For example, in the first RE, the repeater may map 2 modulated symbols corresponding to 2 layers. Then the repeater map next 2 modulated symbols to a next RE, which is adjacent to the previous RE in frequency domain (in the next subcarrier). The repeater continues the process above until all un-occupied REs in one time-domain OFDM symbol of the second PDSCH are all mapped, and then continues the process in the next time-domain OFDM symbol until all OFDM symbols in the 4 TTIs belonging to the second PDSCH are all mapped.

In certain configurations, the base station 902 transmits configurations defining the mapping rule to the repeater 906. In certain configurations, the mapping rule depends on the MAC layer and/or PHY layer of the repeater 906. The re-encoded bits are provided to the MAC layer and/or PHY layer of the repeater 906. The MAC layer and/or PHY layer then determines how to modulates the re-encoded bits and place the modulation symbols into the PDSCHs 948-1, 948-2, 948-3 and 948-4.

Figure 11:
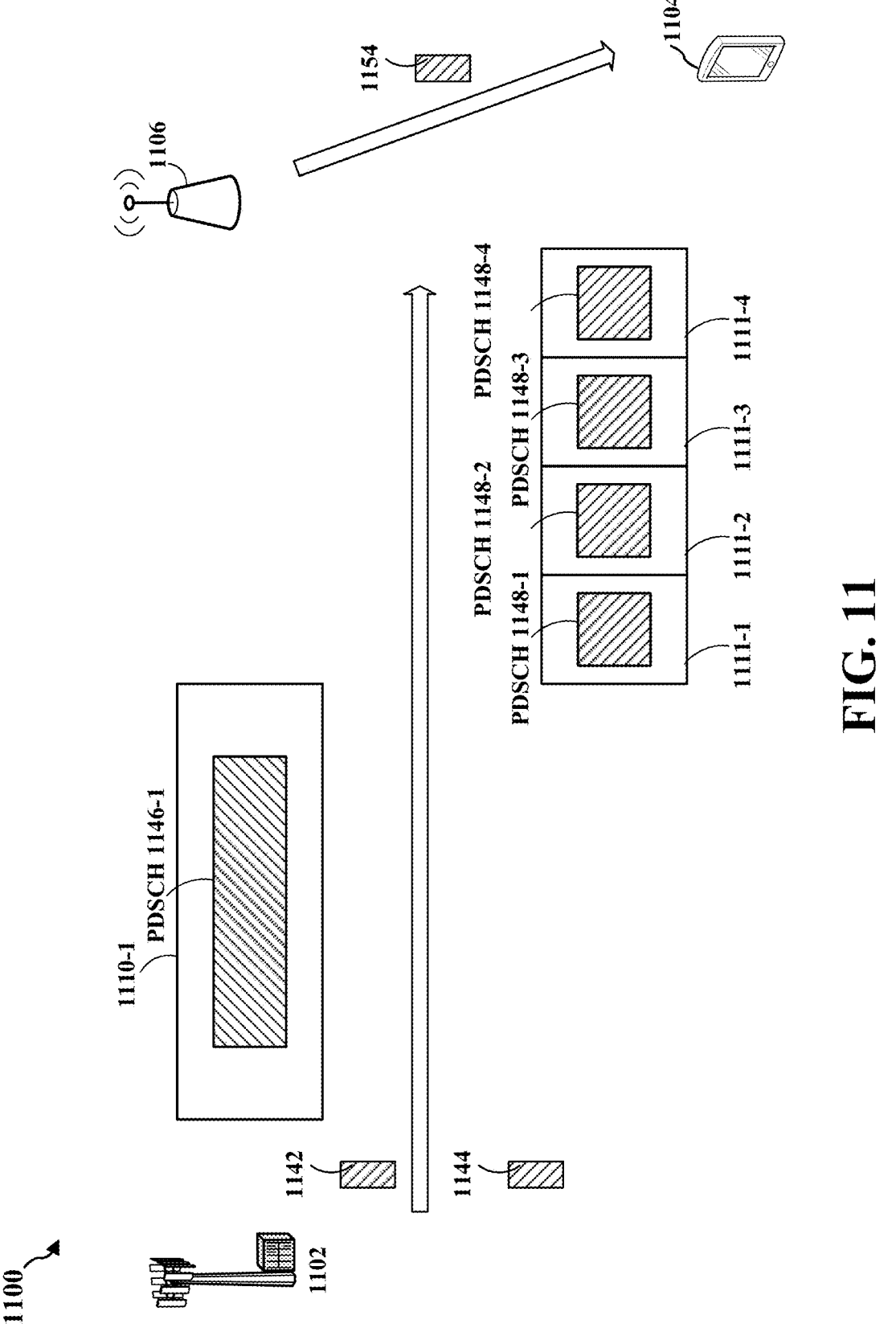
FIG. 11 is a diagram illustrating signaling schemes for communication from a base station to a UE via a repeater.

FIG. 11 is a diagram 1100 illustrating signaling schemes for communication from a base station to a UE via a repeater. As described supra, a base station 1102 transmits data in a PDSCH 1146-1 on the time-frequency resources $(f, t)_1$. The repeater receives the data in the PDSCH 1146-1 and re-transmits the data in PDSCHs 1148-1, 1148-2, 1148-3 and 1148-4 on the time-frequency resources $(f, t)_2$. More specifically, according to the mapping rule described supra, the PDSCH 1146-1 in a slot 1110-1 is mapped to the PDSCH 1148-1 in a slot 1111-1, the PDSCH 1148-2 in a slot 1111-2, the PDSCH 1148-3 in a slot 1111-3 and the PDSCH 1148-4 in a slot 1111-4. The slots 1110-1, 1110-2 etc. correspond to a first subcarrier spacing $(SCS_1$, e.g., 30 kHz). The slots 1111-1, 1111-2, 1111-3 and 1111-4 etc. correspond to a second subcarrier spacing $(SCS_2$, e.g., 120 kHz).

In a first scheme, the base station 1102 may transmit a PDCCH 1142 to a repeater 1106 and a UE 1104 in the time-frequency resource $(f, t)_1$. The PDCCH 1142 indicates resources for the PDSCH 1146-1 in the time-frequency resources $(f, t)_1$ and also indicates resources for the PDSCHs 1148-1, 1148-2, 1148-3 and 1148-4 in the time-frequency resources $(f, t)_2$. The repeater 1106 receives the PDCCH 1142 on $(f, t)_1$ and determines the resources allocations for the PDSCH 1146-1 based on the PDCCH 1142. The UE 1104 also receives the PDCCH 1142 on $(f, t)_1$ and determines the resources allocations for the PDSCHs 1148-1, 1148-2, 1148-3 and 1148-4 based on the PDCCH 1142.

In a second scheme, the PDCCH 1142 transmitted by the base station 1102 indicates control information associated only with the first PDSCH 1146-1 transmitted on the first time-frequency resources $(f, t)_1$, without explicitly indicating control information associated with the second PDSCHs 1148-1, 1148-2, 1148-3 and 1148-4 transmitted on $(f, t)_2$. For example, the PDCCH 1142 may indicate the resource allocation for the first PDSCH 1146-1 without indicating the resource allocations for the second PDSCHs 1148-1, 1148-2, 1148-3 and 1148-4 In this case, the repeater 1106 determines the resource allocations for the second PDSCHs 1148-1, 1148-2, 1148-3 and 1148-4 based on a predefined mapping rule. The UE 1104 also receives the PDCCH 1142 transmitted by the base station 1102 on the first time-frequency resources $(f, t)_1$. However, the PDCCH 1142 does not explicitly indicate the resource allocations for the second PDSCHs 1148-1, 1148-2, 1148-3 and 1148-4 To determine the resources for the second PDSCHs 1148-1, 1148-2, 1148-3 and 1148-4, the UE 1104 is pre-configured with the same mapping rule as the repeater 1106. Using this mapping rule, the UE 1104 can calculate the resource allocations for the second PDSCHs 1148-1, 1148-2, 1148-3 and 1148-4 based on the resource allocation of the first PDSCH 1146-1 indicated in the PDCCH 1142.

In a third scheme, the base station 1102 transmits the first PDCCH 1142 on the first time-frequency resources $(f, t)_1$ to the repeater 1106 and a second PDCCH 1144 to the UE 1104. The first PDCCH 1142 contains control information for the first PDSCH 1146-1 transmitted by the base station 1102. The repeater 1106 receives and decodes the first PDCCH 1142 to determine the resource allocations for the first PDSCH 1146-1. The second PDCCH 1144 contains control information indicating the resource allocations for the second PDSCHs 1148-1 to 1148-4 on $(f, t)_2$ transmitted by the repeater 1106. The second PDCCH 1144 may be transmitted on $(f, t)_1$ and serves as cross-carrier scheduling. The UE 1104 receives and decodes the second PDCCH 1144 to determine the resource allocations for the second PDSCHs 1148-1 to 1148-4 transmitted from the repeater 1106. In certain configurations, the first PDCCH 1142 and second PDCCH 1144 may be transmitted one different frequency bands, for example the first PDCCH 1142 in FR1 and second PDCCH 1144 in FR2, if the channel conditions permit. In particular, the PDCCH 1144 may be transmitted on (f, t)₂.

In a fourth scheme, the base station 1102 transmits the first PDCCH 1142 on the first time-frequency resources (f, t)₁ to the repeater 1106. The repeater 1106 transmits a third PDCCH 1154 on the second time-frequency resources (f, t)₂ to the UE 1104. In a fourth scheme, the base station 1102 transmits the first PDCCH 1142 on the first time-frequency resources (f, t)₁ to the repeater 1106. The repeater 1106 receives and decodes the first PDCCH 1142 to determine the resource allocations for the first PDSCH 1146-1. The repeater 1106 then transmits a third PDCCH 1154 on the second time-frequency resources (f, t)₂ to the UE 1104. The third PDCCH 1154 contains control information indicating the resource allocations for the second PDSCHs 1148-1 to 1148-4 on (f, t)₂ transmitted by the repeater 1106. The UE 1104 receives and decodes the third PDCCH 1154 to determine the resource allocations for the second PDSCHs 1148-1 to 1148-4 transmitted from the repeater 1106.

FIG. 12 is a flow chart 1200 of a method (process) for decoding and forwarding data transmitted from a base station to a UE. The method may be performed by a wireless device (e.g., the repeater 806, the repeater 906, the repeater 1106). In operation 1202, the wireless device receives, from a base station, a first physical downlink control channel (PDCCH) that indicates a resource allocation of a first physical downlink shared channel (PDSCH) transmitted on a first time-frequency resource by the base station. In operation 1204, the wireless device decodes data carried in the first PDSCH according to the first PDCCH. In operation 1206, the wireless device obtains a resource allocation of a second PDSCH based on a mapping rule. The mapping rule maps resources of the first PDSCH to resources of the second PDSCH. In particular, the mapping rule may map a frequency domain location, time domain location, or spatial layer data of resources of the first PDSCH to respective resources of the second PDSCH.

In operation 1208, the wireless device generates encoded bits for the second PDSCH based on the decoded data carried in the first PDSCH and the resource allocation of the second PDSCH. In operation 1210, the wireless device generates reference signals associated with the second PDSCH. When transmitting the second PDSCH, the wireless device needs to transmit corresponding reference signals along with the second PDSCH for channel estimation by the UE. In operation 1212, the wireless device transmits, to a UE, the encoded bits on the resources of the second PDSCH on the second time-frequency resource.

In certain configurations, prior to receiving the first PDCCH, the wireless device receives a configuration defining the mapping rule from the base station. In certain configurations, the mapping rule depends on the MAC layer and/or PHY layer of the wireless device. The re-encoded bits are provided to the MAC layer and/or PHY layer which determines how to modulate the re-encoded bits and place the modulation symbols into the second PDSCH.

In certain configurations, the first PDCCH further indicates control information associated with the second PDSCH. The control information may indicate configuration for generating the reference signals, the mapping rule, resource allocation of the second PDSCH, number of spatial layers, and/or modulation and code rate.

In certain configurations, the wireless device generates a second PDCCH that indicates control information associated with the second PDSCH and transmits the second PDCCH to the UE prior to transmitting the data on the resources of the second PDSCH.

FIG. 13 is a flow chart 1300 of a method (process) for receiving data transmitted from a base station via a repeater. The method may be performed by a UE (e.g., the UE 804, the UE 904, the UE 1104). According to a first scheme, in operation 1302, the UE receives, from a base station and on a first time-frequency resource, a first PDCCH that indicates a resource allocation of a first PDSCH transmitted by the base station to the wireless device. The first PDSCH carries the data. The resource allocation of the second PDSCH is determined based on a mapping rule that maps resources of the first PDSCH to resources of the second PDSCH. The mapping rule maps a frequency domain location, time domain location, or spatial layer data of resources of the first PDSCH to respective resources of the second PDSCH. In operation 1304, the UE receives, from the repeater or the base station, a configuration defining the mapping rule.

According to a second scheme, in operation 1312, the UE receives, from the base station and on the first time-frequency resource, the first PDCCH that indicates the resource allocation of the first PDSCH transmitted by the base station to the repeater and that also indicates the resource allocation of the second PDSCH.

According to a third scheme, in operation 1322, the UE receives, from the repeater and on the second time-frequency resource, a second PDCCH indicating the resource allocation of the second PDSCH.

According to a fourth scheme, in operation 1332, the UE receives, from the base station and on the first time-frequency resource, the second PDCCH indicating the resource allocation of the second PDSCH.

Following the operation 1304, 1312, 1322, or 1332, in operation 1342, the UE determines the resource allocation of the second PDSCH on the second time-frequency resource transmitted from the wireless device and carrying data transmitted from the base station. In operation 1344, the UE receives, from the wireless device, the second PDSCH on the second time-frequency resource according to the resource allocation. In operation 1346, the UE decodes the data carried in the second PDSCH.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a wireless device, comprising:

receiving, from a base station, a first physical downlink control channel (PDCCH) that indicates a resource allocation of a first physical downlink shared channel (PDSCH) transmitted on a first time-frequency resource;

decoding data carried in the first PDSCH according to the first PDCCH;

obtaining a resource allocation of a second PDSCH based on a mapping rule, wherein the mapping rule maps resources of the first PDSCH to resources of the second PDSCH;

generating encoded bits for the second PDSCH based on the decoded data carried in the first PDSCH and the resource allocation of the second PDSCH;

generating reference signals associated with the second PDSCH; and transmitting, to a user equipment (UE), the encoded bits on the resources of the second PDSCH on the second time-frequency resource.

2. The method of claim 1, wherein the mapping rule maps a frequency domain location, time domain location, or spatial layer data of resources of the first PDSCH to respective resources of the second PDSCH.

3. The method of claim 1, further comprising:

receiving, from the base station, a configuration defining the mapping rule before receiving the first PDCCH.

4. The method of claim 1, wherein the mapping rule is indicated by a Media Access Control (MAC) layer of the wireless device or a Physical (PHY) layer of the wireless device.

5. The method of claim 1, wherein the first PDCCH further indicates control information associated with the second PDSCH.

6. The method of claim 5, wherein the control information associated with the second PDSCH indicates at least one of: a configuration for generating the reference signals, the mapping rule, the resource allocation of the second PDSCH, a number of spatial layers, and a modulation and code-rate (MCS) indicator.

7. The method of claim 1, further comprising:

generating a second PDCCH that indicates control information associated with the second PDSCH; and transmitting the second PDCCH to the UE prior to the transmission of the data on the resources of the second PDSCH.

8. A method of wireless communication of a user equipment (UE), comprising:

determining a resource allocation of a second physical downlink shared channel (PDSCH) on a second time-frequency resource transmitted from a wireless device and carrying data transmitted from a base station;

receiving, from the wireless device, the second PDSCH on the second time-frequency resource according to the resource allocation; and decoding the data carried in the second PDSCH.

9. The method of claim 8, further comprising:

receiving, from the base station and on a first time-frequency resource, a first physical downlink control channel (PDCCH) that indicates a resource allocation of a first PDSCH transmitted by the base station to the wireless device, wherein the resource allocation of the second PDSCH is determined based on a mapping rule that maps resources of the first PDSCH to resources of the second PDSCH, wherein the first PDSCH carries the data.

10. The method of claim 9, wherein the mapping rule maps a frequency domain location, time domain location, or spatial layer data of resources of the first PDSCH to respective resources of the second PDSCH.

11. The method of claim 9, further comprising: receiving, from a repeater or the base station, a configuration defining the mapping rule.

12. The method of claim 8, further comprising: receiving, from the base station and on a first time-frequency resource, a first physical downlink control channel (PDCCH) that indicates a resource allocation of a first PDSCH transmitted by the base station to a repeater and the resource allocation of the second PDSCH.

13. The method of claim 8, further comprising: receiving, from a repeater and on the second time-frequency resource, a second PDCCH indicating the resource allocation of the second PDSCH.

14. The method of claim 8, further comprising:

receiving, from the base station and on the first time-frequency resource, a second PDCCH indicating the resource allocation of the second PDSCH.

15. An apparatus for wireless communication, the apparatus being a wireless device, comprising:

a memory; and at least one processor coupled to the memory and configured to:

receive, from a base station, a first physical downlink control channel (PDCCH) that indicates a resource allocation of a first physical downlink shared channel (PDSCH) transmitted on a first time-frequency resource;

decode data carried in the first PDSCH according to the first PDCCH;

obtain a resource allocation of a second PDSCH based on a mapping rule, wherein the mapping rule maps resources of the first PDSCH to resources of the second PDSCH;

generate encoded bits for the second PDSCH based on the decoded data carried in the first PDSCH and the resource allocation of a second PDSCH;

generate reference signals associated with the second PDSCH; and transmit, to a user equipment (UE), the encoded bits on the resources of the second PDSCH on the second time-frequency resource.

16. The apparatus of claim 15, wherein the mapping rule maps a frequency domain location, time domain location, or spatial layer data of resources of the first PDSCH to respective resources of the second PDSCH.

17. The apparatus of claim 15, wherein the at least one processor is further configured to:

receive, from the base station, a configuration defining the mapping rule before receiving the first PDCCH.

18. The apparatus of claim 15, wherein the mapping rule is indicated by a Media Access Control (MAC) layer of the wireless device or a Physical (PHY) layer of the wireless device.

19. The apparatus of claim 15, wherein the first PDCCH further indicates control information associated with the second PDSCH.

20. The apparatus of claim 15, wherein the control information associated with the second PDSCH indicates at least one of: a configuration for generating the reference signals, the mapping rule, the resource allocation of the second PDSCH, a number of spatial layers, and a modulation and code-rate (MCS) indicator.

* * * * *